US008864345B2

(12) United States Patent
Bakk

(10) Patent No.: US 8,864,345 B2

(45) Date of Patent: Oct. 21, 2014

(54) LED LAMP

(75) Inventor: Istvan Bakk, Torokbalint (HU)

(73) Assignee: Ledon Lighting Jennersdorf GmbH, Jennersdorf (AT)

( * ) Notice: Subject to any disclaimer, the term of this patent is extended or adjusted under 35 U.S.C. 154(b) by 1212 days.

(21) Appl. No.: 12/769,566

(22) Filed: Apr. 28, 2010

(65) Prior Publication Data

US 2010/0271836 A1 Oct. 28, 2010

(30) Foreign Application Priority Data

Apr. 28, 2009 (DE) ........................ 10 2009 019 227

(51) Int. Cl.

| | |
|---|---|
| ***B60Q 1/04*** | (2006.01) |
| ***H01J 61/52*** | (2006.01) |
| ***F21V 29/00*** | (2006.01) |
| ***F21K 99/00*** | (2010.01) |
| ***F21V 3/00*** | (2006.01) |
| *F21S 8/10* | (2006.01) |
| *F21Y 101/02* | (2006.01) |

(52) U.S. Cl.

CPC ............. *F21V 29/006* (2013.01); *F21S 48/115* (2013.01); *F21S 48/1233* (2013.01); *F21S 48/328* (2013.01); *F21V 29/004* (2013.01); *F21K 9/00* (2013.01); *F21V 3/005* (2013.01); *F21V 29/22* (2013.01); *F21Y 2101/02* (2013.01); *F21S 48/335* (2013.01)

USPC ................ 362/311.02; 362/254; 362/249.02; 362/547

(58) Field of Classification Search

CPC ........................................................ F21K 9/00

USPC ........................ 362/311.02, 254, 249.02, 547

See application file for complete search history.

(56) References Cited

U.S. PATENT DOCUMENTS

| | | | | |
|---|---|---|---|---|
| 3,935,491 | A * | 1/1976 | Hugot | 313/25 |
| 2006/0158886 | A1 * | 7/2006 | Lee | 362/318 |
| 2006/0261359 | A1 * | 11/2006 | Huang | 257/98 |

* cited by examiner

*Primary Examiner* — Elmito Breval

(74) *Attorney, Agent, or Firm* — Christensen O'Connor Johnson Kindness PLLC

(57) ABSTRACT

Embodiments of the present invention generally relate to an LED lamp having a heat dissipating means as well as a head-lamp (to be mounted e.g. to the front of a vehicle such as e.g. a car or a truck) comprising said LED lamp. Embodiments of the present invention also generally relate to a method for dissipating heat from an LED lamp.

33 Claims, 7 Drawing Sheets

LED LAMP

FIELD OF THE INVENTION

The invention is directed to an LED lamp having a heat dissipating means as well as a headlamp (to be mounted e.g. to the front of a vehicle such as e.g. a car or a truck) comprising said LED lamp. The invention is further directed to a method for dissipating heat from an LED lamp.

BACKGROUND

LED lamps, particularly retrofit LED lamps, are well known in the state of the art. A retrofit LED bulb can be perceived as a an LED lamp which can replace a common incandescent lamp or a halogen lamp or a compact fluorescent light without being adapted, that is having the same contacting base element (e.g. screwed contact base of an incandescent lamp, or pin contact elements of halogen lamps, or the like). The size of a retrofit LED light bulb is a serious limiting factor. The surface of the cooling element is competing with the light distributing element and the driving electronics. The larger the light diffuser the more an incandescent bulb radiation pattern is achieved. Feasible light transmissive materials have poor heat-conducting property, therefore the area used for light distribution is lost for heat transport to air.

A possible solution is heat convection by light transmissive fluids, having high temperature-density dependence. This problem has been addressed before in EP 1 881 259 A1, for instance, by immersing the LED module to a fluid bath. When doing so a high volume of the fluid is present having a high weight. Additionally, when heating up, the volume change is high, leading to a high overpressure inside the bulb such that the large quantity of hot liquid may spill when the light bulb got broken due to said overpressure.

Additionally, the cooling of LEDs in automotive headlamp applications is a challenge, and in most cases active cooling systems are used, wherein the other problem is the defrosting of the headlamp during cold seasons. Traditional headlamp sources (e.g. incandescent, halogen, discharge) radiate a significant portion of infrared light, thus defrosting the headlamp envelope.

SUMMARY

The present invention has been achieved in view of the above-mentioned drawbacks, and an object thereof is to provide an LED lamp having a heat dissipating means comprising a small amount of a heat transfer fluid while attaining sufficient heat dissipation.

Said object is to be accomplished by means of the independent claim 1. The dependent claims advantageously study further the central idea of the invention.

The present invention as set forth in claim 1 is an LED lamp having a heat dissipating means for dissipating heat from the heat sink, wherein the heat dissipating means comprises an at least partially double-layered element having a heat transfer fluid filled cavity for fluid circulation.

In accordance with this arrangement, only a little amount of heat transfer fluid (in the following also referred to as fluid) is needed while having an extensive area for heat transport to air, thus improving the heat dissipation. This also results in a LED lamp with reduced weight in comparison to a lamp whose volume is completely filled with a fluid, and the lamp thus also being cheaper. Moreover, when heating up, the volume change is comparatively low, thus the danger of breaking of, e.g., the bulb due to a high overpressure is reduced. Even if the heat dissipating means (e.g. the bulb) got broken due to whatever reasons, only a little quantity of hot liquid could spill so that severe injuries of users can be reduced or even avoided. Hence, the risks incurred by a breaking cap and the corresponding leakage of heated fluid are reduced.

In the present invention as set forth in claim 2, the heat dissipating means is designed such that the circulation is attained by (natural) heat convection. Therefore, there is no need for an active cooling system for actively circulating the fluid, thus reducing the number of parts and the complexity of the arrangement. Moreover, a simple way of heat dissipation is given by simply using the (high) temperature density dependence of the liquid for making it circulating due to the convection. The convection heat transfer also has the advantage that the mechanism will work in any position (i.e. hanging, standing, etc.), e.g. of a retrofit LED lamp or the like.

In the present invention as set forth in claim 3, the heat dissipating means is a light diffuser means for light distribution of the light emitted by the LED module, and in the present invention as set forth in claim 4, the double-layered element is a transparent cap. It is thus possible to partially or even wholly use the area used for light distribution or diffusion for heat transport to air while applying only a little amount of heat transfer fluid.

To achieve homogenous light distribution (without shadowing) it is of importance that the refractive indexes of the material(s) forming the transparent envelope and the filing liquid are matched, i.e. their refractive indexes are essentially identical, at least within 6%, preferably within 2%. E.g. in case the transparent envelope is made of PMMA (polymetylmetacrylate, refractive index ~1.49), a silicone oil can be chosen as heat transfer fluid. Silicone oils have refractive indexes of between 1.45-1.50 thus matching the refractive index of PMMA.

In the present invention the heat dissipating means may be a double-walled, at least partially transparent envelope having an inner shell and an outer shell. Therefore, a LED lamp may be shaped as a transparent envelope or as a common light bulb obtaining advantageous heat dissipation by applying the light distribution area additionally for the heat transport to air.

In the present invention the LED bulb may be a retrofit LED lamp or retrofit LED light bulb. “Retrofit” is to be understood as the lamp having mechanical and electrical connection means (sockets) corresponding to halogen, compact fluorescent or incandescent lamps. Hence, an LED lamp can be attained comprising the inventive heat dissipation while the LED lamp can at the same time simply replace common lamp types as, for instance, incandescent lamps or halogen lamps or compact fluorescent lights without any changes at the luminaire. Hence, the field of application of the LED lamp is widened.

In the present invention as set forth in claim 7, the LED lamp further comprises a heat sink on which an LED module is attached, wherein the heat dissipating means is designed such that the fluid can circulate inside of the double-layered element for dissipating heat from the heat sink. Thus, common LED modules can be used being attached on said heat sink or substrate. Additionally, the area for dissipating the heat from the heat sink to the fluid is enlarged, which results in an improved heat dissipation.

In the present invention as set forth in claim 8, the fluid is sealed by means of the two layers of the double-layered element being molten at their open side or by means of a base element. Therefore, the fluid is securely sealed inside the double-layered element.

In the present invention as set forth in claim 9, the base element is arranged between the heat sink and the heat dissipating means for heat conductive sealing. Since the base element as sealing member is arranged between the heat sink and the heat dissipating means, the heat dissipating means can be simply attached while the sealing is obtained at the same time and the heat transfer from the heat sink to the heat dissipating means is not hindered but even supported via the base element being heat conductive.

In the present invention as set forth in claim 10, the base element is a ring member, and in the present invention as set forth in claim 11, the two layers of the double-layered element are bonded to the inner and outer side of the ring member by glue or heating. Thus, the two layers of the double-layered element can be easily fixed to the base element particularly in case the heat dissipating means is a double-walled retrofit LED light bulb commonly having a circular cross section.

In the present invention as set forth in claim 12, flow directing elements are arranged between the layers of the double-layered element. Thereby, the convection can be enhanced since the fluid can be guided so as to achieve the best heat dissipation. Additionally, the action driven circulation is promoted without blocking the emission of the light.

In the present invention as set forth in claim 13, the flow directing elements are integrally molded with the double-layered element. Thus, the production of the LED lamp can be simplified, time can be saved and thus costs can be reduced.

In the present invention as set forth in claim 14, the flow directing elements are made of glue or polymer stripes. Hence, flow directing elements can be easily provided or even molded together with the heat dissipating means, thus facilitating the production and saving time and costs.

In the present invention as set forth in claim 15, convection enhancing elements are arranged between the layers of the double-layered element, and in the present invention as set forth in claim 16, the convection enhancing elements comprise heat transfer elements or heat insulated elements. By means of said features, the convection is supported by extra convection enhancing means, thus leading to an enhanced and more secure heat transfer.

In the present invention as set forth in claim 17, the convection enhancing elements comprise heat conductive elements and heat insulated elements being alternately arranged. Hence, by using both aforementioned features the convection can be even more enhanced.

In the present invention as set forth in claims 18 and 19, the heat conductive elements comprise rods and/or leaders extending from an interface region of the heat dissipating means and one of the LED module, the heat sink or the base element into the heat transfer fluid filled cavity and are made of a heat conductive material, for example a heat conductive metal. Thus, the heat can be transported to the fluid over a larger surface while the fluid itself is guided along the rods and/or leaders so as to improve the convective flow of heat.

In the present invention as set forth in claim 20, the heat insulated elements are formed by isolating material(s), e.g. silicon foam insulators.

In the present invention as set forth in claim 21, the fluid is a water-based antifreeze agent with alcohol or glycol, or mineral oil, or silicone oil, or their mixtures, and in the present invention as set forth in claim 25, the fluid is water, or acetone, or alcohol, or a combination thereof.

In the present invention as set forth in claim 22, the heat dissipating means comprises a wick means for accumulating the heat transporting fluid in a groove portion of the heat dissipating means close to an interface region with one of the LED module, the heat sink or the base element. By means of said feature, the cavity must not completely filled with a heat transfer fluid but the circulation can also be achieved with an even reduced amount of said fluid since the flow back is secured due to the wick means. Hence, the safety of said lamp with respect to an overpressure in the heat dissipation means and the risks of the fluid spilling when the lamp got broken are minimized.

In the present invention as set forth in claim 23, the wick means extends into the cavity from the groove region away from the LED module. Hence, a capillary force is present over the whole heat dissipating means thus further enhancing the flow back of the fluid.

In the present invention as set forth in claim 24, the wick means is made of glass fiber, porous coating or finishing of the inner surface or any kind of surface patterning. Hence, the wick means can be simply applied to the heat dissipating means by inserting a glass fiber or establishing the surface while manufacturing the heat dissipating means.

In the present invention as set forth in claim 25, the wick means is transparent or translucent. Hence, the light can pass the wick means unaffected, thus not hindering the light distribution or emission.

In the present invention as set forth in claim 26, the heat transfer fluid is water, or acetone, or alcohol, or a combination thereof.

In the present invention as set forth in claim 27, the layers of the double-layered element are arranged substantially parallel to each other. By means of said feature, a uniform convection and thus heat dissipation can be obtained.

In the present invention as set forth in claim 28, the layers of the double-layered element converge at least in a groove region of the heat dissipating means close to an interface region with one of the LED module, the heat sink or the base element such that capillary forces can be effective in said groove region.

It promotes the back-flow of the fluid into the region of the heat dissipating means in which the heat is exchanged to the fluid. Hence, the amount of fluid used for heat dissipation can be reduced also in case not using a wick means.

In the present invention as set forth in claim 29, the double-layered element is made of glass or plastic material(s), such as, e.g., polycarbonate (PC), silicon rubber or other substantially transparent or translucent material.

The present invention as set forth in claims 30 and 31 is a headlamp comprising an LED lamp according to any one of the preceding claims, and in the present invention as set forth in claim 30, the headlamp further comprises a headlamp housing, wherein the headlamp housing at least partially comprises the heat dissipating means. Using the invented LED lamp in a headlamp for, e.g., vehicles, cooling of the LEDs as well as defrosting of the headlamp housing is managed at the same time, thus reducing the number of parts, facilitating the production and reducing costs.

The present invention also relates to a method for dissipating heat from an LED lamp as set forth in claim 32. In the method the heat generated on/in the LED module is at first transferred to the heat sink and then to an interface region of a heat dissipating means having an at least partially double-layered element filled with a heat transfer fluid. The heat is dissipated via the heat transfer fluid by heat convection inside of the heat dissipating means.

As set forth in claim 33 the method of the present invention comprises the steps of evaporating the heat transfer fluid when being heated, condensation of the vapor at colder regions of the heat dissipating means, and driving back of the condensate to a groove region of the heat dissipating means close to the interface region with one of the LED module, the heat sink or the base element by capillary forces.

As set forth in claim 34 the capillary forces can be affected by the wick means and/or the two layers of the double-layered element converging in the groove region.

This summary has been provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

Further features, advantages and objects of the present invention would come apparent for the skilled person when reading the following detailed description of embodiments of the present invention, when taking in conjunction with the figures of the enclosed drawings.

DESCRIPTION OF THE REFERENCE NUMERALS

Figure 1:
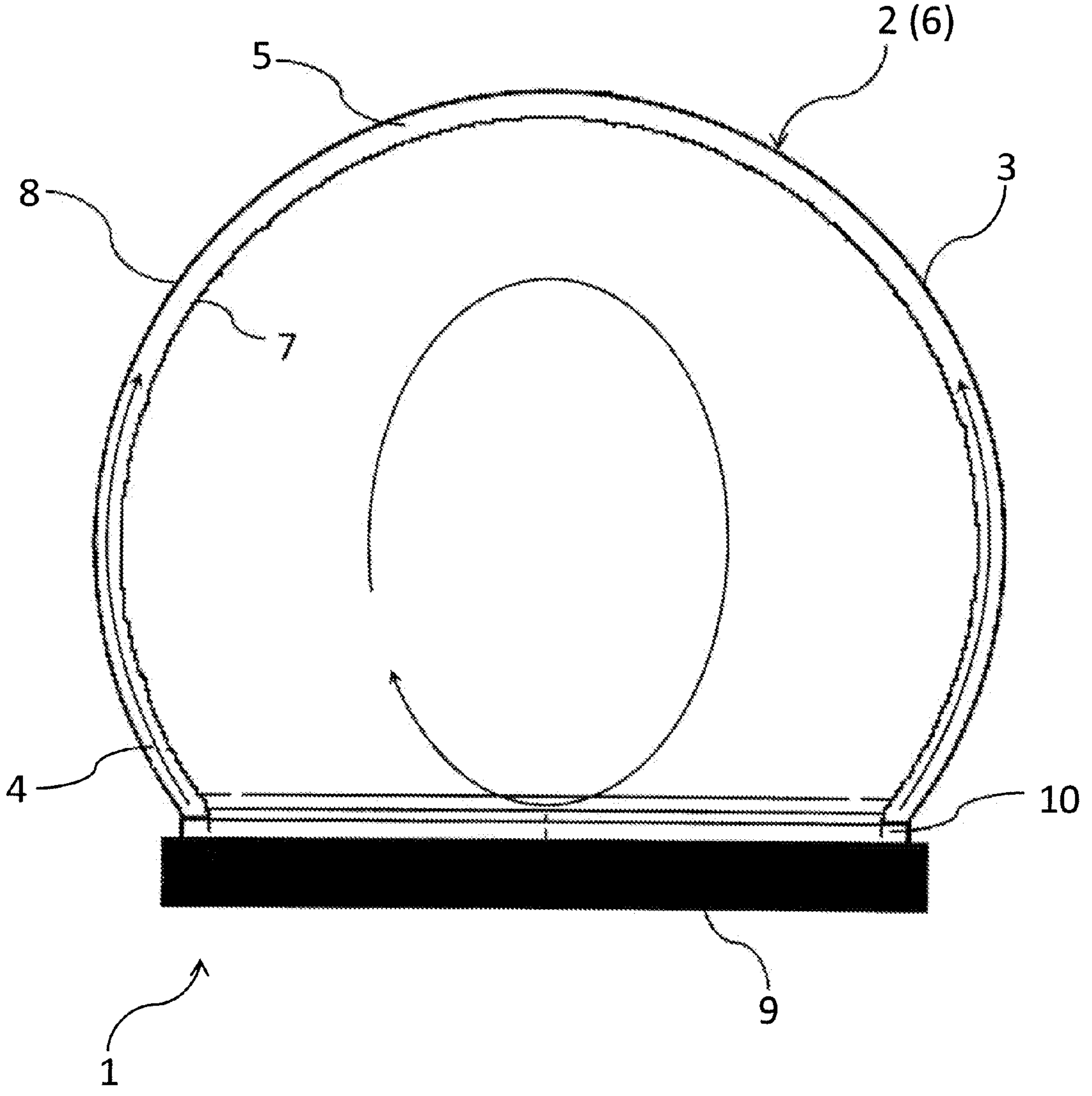
FIG. 1 shows a cross-sectional side view of an embodiment of an LED lamp according to the present invention comprising a first embodiment of a heat dissipating means.

1, 1', 50 LED lamp
2, 2' heat dissipating means
3, 3' double-walled or double-layered element
4 fluid for heat exchange
5 cavity
6 transparent envelope
7 inner shell
8 outer shell
9 heat sink
10 base element
11 chamber
20 convection enhancing element; heat conductive element; rod
21 convection enhancing element; heat conductive element; leader
22 convection enhancing element; heat insulated element
30, 31 flow directing element
40 wick means
41 (capillary) grooves
50 headlamp
51 heat sink or heat pipe
52 headlamp housing
53 optical element, e.g. lens
G groove region
I interface region
L light
M LED module

DETAILED DESCRIPTION

FIG. 1 shows an LED lamp 1 according to an embodiment of the invention. The LED lamp 1 comprises a heat dissipating means 2 for dissipating heat from the heat sink 9, 51 of the LED lamp 1. The heat dissipating means 2 comprises an at least partially double-walled or double-layered element 3 having a heat transfer fluid 4 filled cavity 5 between for fluid circulation. As will be more precisely explained in the following, when using said arrangement, only a little amount of heat transfer fluid 4 is needed in comparison with a lamp in which the fluid is filled in the whole space inside the heat dissipating means, thus the heat transfer fluid 4 amount can be considerably reduced and the heat dissipation is enhanced. This also results in a much more lightweight LED lamp 1 with respect to a lamp whose volume is completely filled with a fluid, and the lamp thus also being cheaper. Moreover, when heating up, the volume change is comparatively low, thus the danger of breaking of the heat dissipating means 2 as, for instance, a double-walled bulb portion due to a high overpressure is reduced. Even if the heat dissipating means 2 (e.g. the bulb) got broken due to whatever reasons, only a little quantity of hot fluid 4 (e.g. liquid) could spill so that severe injuries of users can be reduced or even avoided. Hence, the risks incurred by a breaking cap and the corresponding leakage of heated fluid 4 are reduced.

Since convection can be easily attained, as also explicitly described and explained below, the mechanism according to the invention will work in any position (i.e. hanging, standing, etc.) and thus, its use is almost unlimited.

As shown in FIG. 1 the heat dissipating means 2 can be a light diffuser means for light distribution of light emitted by the LED module M of the LED lamp 1.

Any LED module of the present invention comprises a carrier such as e.g. a PCB, one or several LED chips and optionally also at least part of the control circuitry for driving the one or more LED(s). "LED" shall also encompass OLEDs. The one more LED chips may be monochromatic. At least one LED chip may be a color converted white LED. Also a RGB array of LED chip may be provided. Generally, the emission of white light is preferred.

The double-layered element 3 can thus preferably be a transparent cap or dome. In this case, the heat dissipating means 2 of the LED lamp 1 preferably is a double-walled element 3 or transparent envelope. A LED retrofit lamp could be called by professionals as "LED light bulb" or "LED retrofit bulb" or simply as "LED bulb". An incandescent bulb could be defined as a light bulb.

The double-walled element should not be in contact with the LED bulb.

The double-walled element 3 may be formed as a transparent envelope or a transparent cap or a casting body etc. It's disturbing to apply light bulb to define the transparent cap, because light bulb as an expression is used widely in this field to identify conventional incandescent bulbs.) The two layers of the double-layered element 3 constitute an inner shell 7 and an outer shell 8. In a preferred embodiment in which the heat dissipating means 2 is a transparent cap or the like, only the outer shell 8 has a light-diffusion effect. It is thus possible to partially or even wholly use the area used for light distribution or diffusion for heat transport to air while applying only a little amount of heat transfer fluid 4. The lamp being configured as retrofit LED lamp has the advantage that it can simply replace a common lamp type as, for instance, incandescent lamps or halogen lamps or compact fluorescent lights without any changes at the lamp while at the same time the inventive heat dissipation is realized. Additionally, it is also preferred to arrange substantially the two layers 7, 8 of the double-layered element 3 in parallel for obtaining an uniform heat dissipation. Nevertheless, the invention is not limited to a parallel arrangement.

It has to be noted that the heat dissipating means 2 is not limited to a bulb or bulb shape of an LED light bulb. The LED lamp 1 may also omit the bulb portion as shown in FIG. 1 and the heat dissipating means can also protrude from the rear side of the LED module, that is a side which is opposite to the emitting direction of the LED module M. Said heat dissipating means can also enclose the driving electronics and may also be configured as a base element as, for instance, a standard bulb base comprising the driving electronic and also including the respective power lines for operating the LED module M and thus being configured as retrofit LED lamp as well. Additionally, all possible solutions of heat dissipating means 2 having an at least partially double-layered element in which cavity a heat transfer fluid can circulate is covered by the invention. Thus, for example, a combination of the heat dissipating means 2 formed as a bulb in any possible shapes in combination with any other possible heat dissipating means according to the invention are covered by the invention as well.

In FIG. 1 there is further shown a heat sink 9 onto which the LED module M can be attached. The heat dissipating means 2 is then designed such that the fluid 4 in the cavity 5 can circulate inside of the double layered element 3 for dissipating heat from the heat sink 9. In other words, there must be a thermal connection between the LED module M and/or, in case a heat sink 9 is applied, the heat sink 9 as well as the fluid 4 in the heat dissipating means 2 such that heat dissipation can securely be accomplished. Thus, common LED modules can be used being attached on said heat sink 9 or substrate. Additionally, the area for dissipating the heat from the heat sink 9 to the fluid 4 is enlarged. Thus the heat dissipation can be enhanced.

Figure 2:
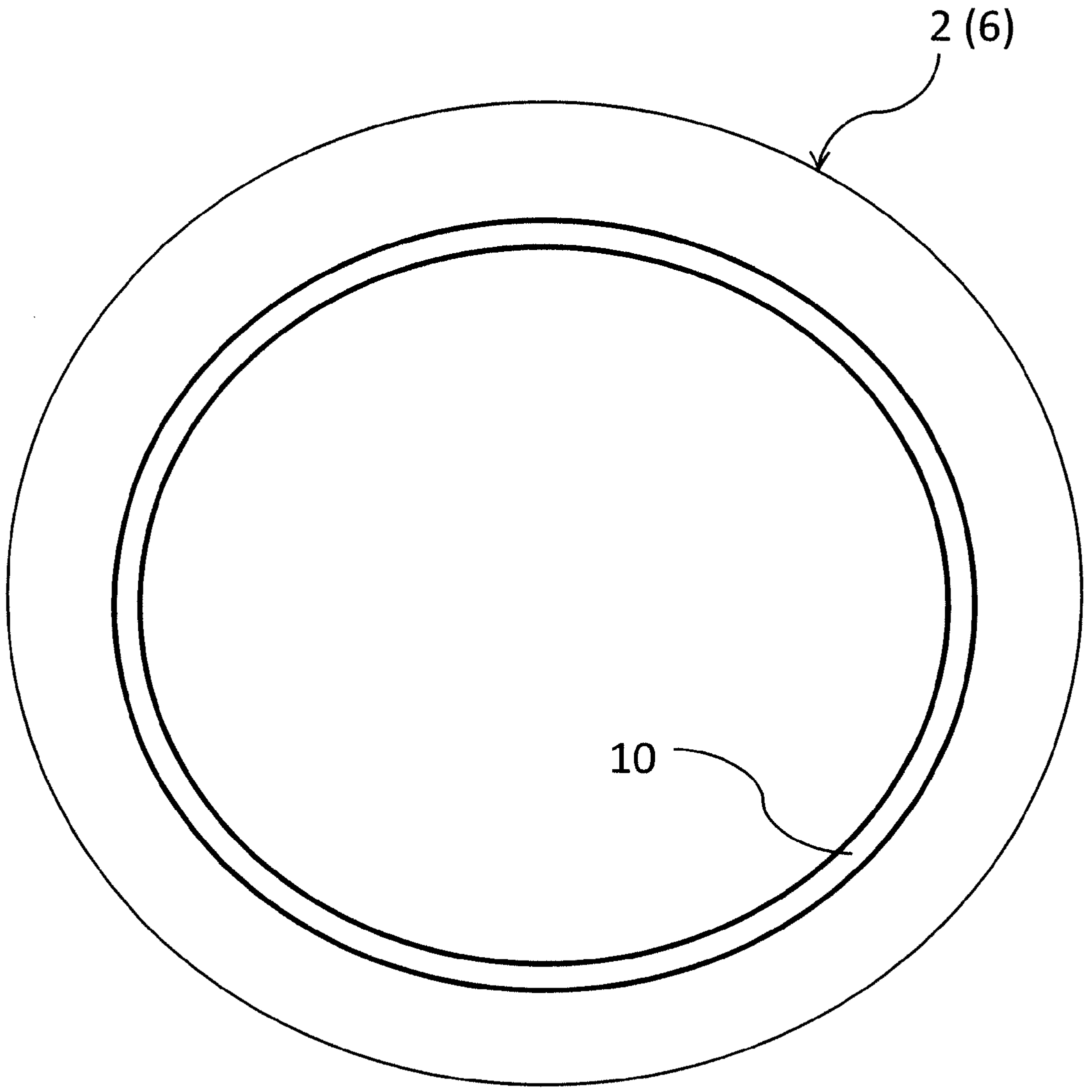
FIG. 2 shows a bottom view of the heat dissipating means according to FIG. 1.

As can be seen in FIGS. 1 and 2, the heat dissipating means 2 or better the heat transfer fluid 4 therein is preferably sealed by means of a base element 10. Therefore, the base element 10 is preferably arranged between the heat sink 9 or, in case no heat sink 9 is applied, the LED module M and the heat dissipating means 2 for heat conductive sealing. Since the base element 10 as sealing member is arranged between the heat sink 9 and the heat dissipating means 2, the heat dissipating means 2 can be simply attached while the sealing is obtained at the same time and the heat transfer from the heat sink 9 to the heat dissipating means 2 is not hindered but even supported via the base element 10 being heat conductive.

The base element 10 is preferably formed as a ring member or ring plate. Said ring member is preferably bonded on the bottom, that is the open end side of the cavity 5 of the heat dissipating means 2. The two layers 7, 8 of the double-layered element 3 can thus preferably be bonded to the inner side and the outer side of the ring member by glue, heating or the like. Thus, the two layers of the double-layered element 3 can be simply arranged and aligned with respect to each other, the fluid 4 in the cavity 5 of the heat dissipating means 2 can be simply and securely sealed while at the same time the whole heat dissipating means 2 can also be simply attached to the LED module M or heat sink 9 or the like for heat dissipation. Hence, the base element 10 is preferably made of a heat conductive material as, for instance, metal, graphite, carbon fiber, ceramic or their compound or other highly thermally conductive material.

The fluid 4 can preferably be injected to the system, i.e. the cavity 5, through at least one hole (not shown) on the base element 10, which is sealed afterwards. Hence, the injection of the fluid 4 can be simply attained when the heat dissipating means 2 has already been assembled, thus facilitating the assembling steps.

Figure 7:
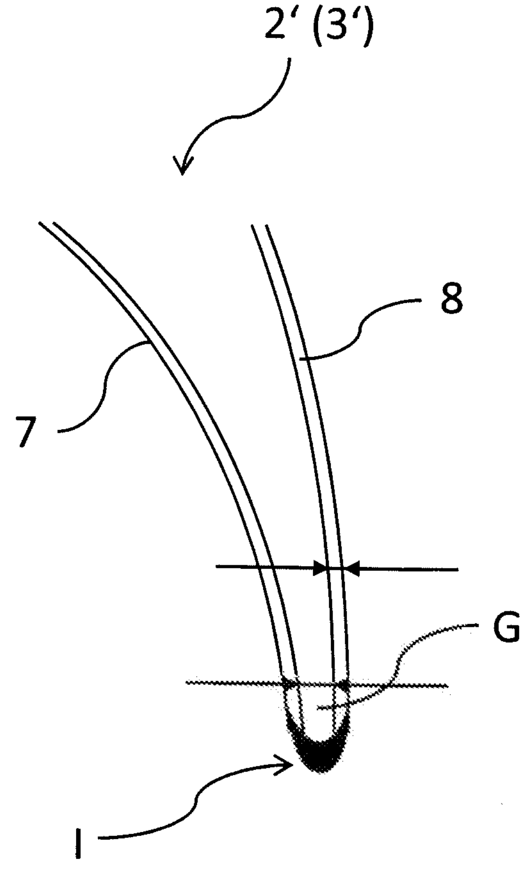
FIG. 7 shows a partial cross-sectional side view of a third embodiment of a heat dissipating means according to the present invention.

It has to be noted that the sealing of the fluid 4 is not limited to the base member 10 but any possible sealing means can be provided onto the open end as long as heat transfer from the LED module M or heat sink 9 to the fluid 4 in the cavity 5 is still ensured. As shown in FIG. 7, the sealing of the fluid 4 may also be achieved by fusing the two layers 7, 8 of the double-layered element 3 at their open end thus forming a closed cavity 5.

In the following, the region between the heat dissipating means 2 and any one of the LED module M, the heat sink 9 or the base element 10, at which the heat radiated from the LED module M is transferred to the heat dissipating means 2, is referred to as interface region I. Additionally, the region inside the cavity 5 and at the bottom of the heat dissipating means 2 as close as possible to the interface region I is referred to as groove region G.

By means of the LED lamp having the above-described heat dissipating means 2 with two layers 7, 8 enclosing the heat transfer fluid 4, a heat convection driven circulation of the fluid 4 can be achieved. In other words, the heat is transferred (exchanged) from the LED module M or heat sink 9 or the like to the fluid 4, preferably via the base member 10, and then the heat is transported by convection forces to the surface of the double-layered element 3. Therefore, the double-layered element 3 is preferably made of glass or from a plastic material, such as, e.g., polycarbonate (PC), silicon rubber or other substantially transparent or translucent material preferably commonly used for lamps. Preferably, the heat resistance of the outer layer of the double-layered element 3 is low in this regime (e.g.: DT=1K at 5 W through a 1 mm thick 60 mm diameter glass or PC halfsphere).

Figure 5:
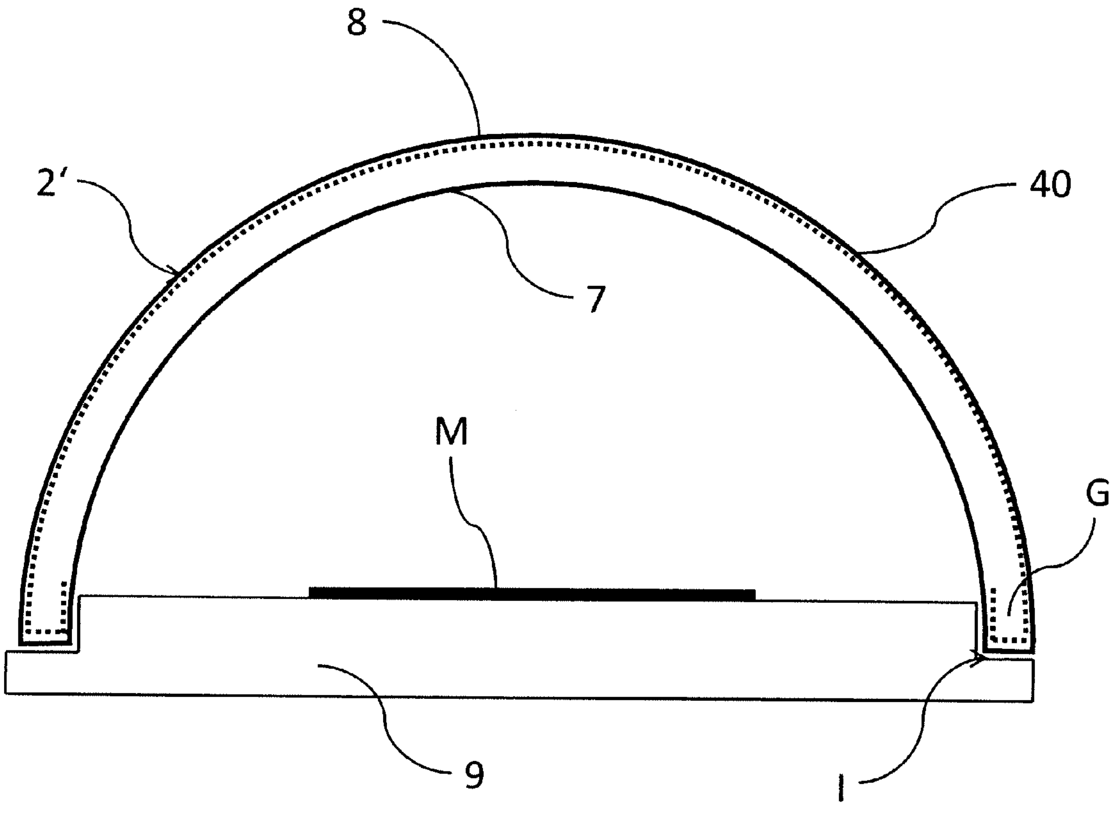
FIG. 5 shows a schematic cross-sectional side view of an LED lamp according to a further embodiment of the invention with a wick means.
Figure 6:
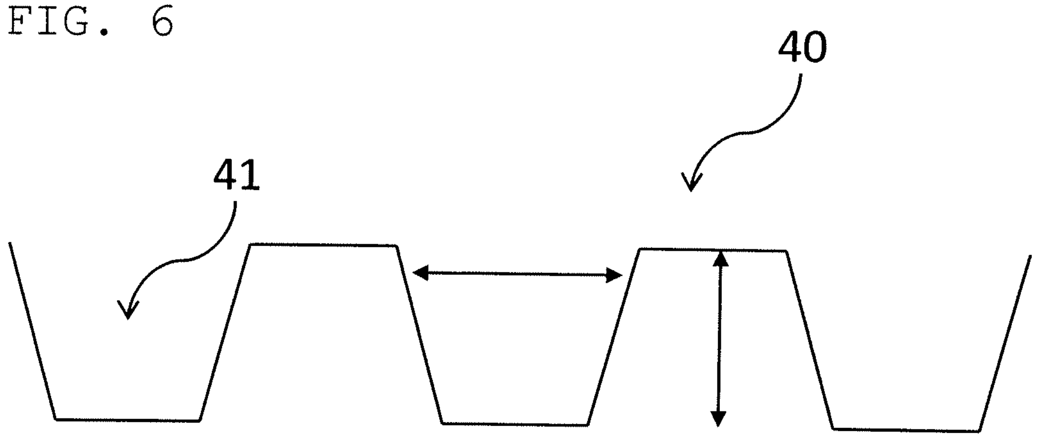
FIG. 6 shows a schematic drawing of wick means.

The heat transfer fluid 4 is preferably selected from those having a sufficiently high density change with temperature for realizing convection. This is especially true for oils or the like. Preferably, the circulating fluid is a liquid due to its much higher heat capacity in comparison to, e.g., gases. The heat transfer (exchange) fluid 4 can thus preferably be a colorless, non-poisonous and low viscosity transparent or translucent material such as water, olive oil, paraffin oil, low viscosity lubricating oil, a water-based antifreeze with alcohol or glycol, particularly methyl alcohol, alcohol or ethylene glycol, or mineral oil, or silicone oil, or an oil base. It can also be a mixture of those. It has to be noted that also phase changes can be used, e.g., a liquid which is evaporated using the heat and which then condensates again when cooling down due to circulation caused by the convection. This will be described later on with respect to the embodiment as shown in FIGS. 5 to 7.

The fluid 4 circulation can be further enhanced by different elements as described in the following. In this regard, FIGS. 3*a* to 3*c* show different embodiments of convection enhancing elements 20, 21, 22 of the LED lamp 1 according to the present invention, and FIG. 4 shows an embodiment of the LED lamp 1 also comprising flow directing elements 30, 31.

The convection enhancing elements 20, 21, 22 are preferably arranged between the layers of the double-layered element 3, i.e. in the cavity 5. The convection enhancing elements 20, 21, 22 preferably extend from the interface region I of the heat dissipating means 2 and any one of the LED module M, the heat sink 9 or the base element 10 into cavity 5 containing heat exchange fluid 4, which preferably is a liquid. The convection enhancing elements 20, 21, 22 are preferably arranged on the base element 10 or on the heat sink 9 or the LED module M, dependent on whether or not a heat sink 9 or a base element 10 are present or the two layers of the double-layered element 3 are attached by melting. The convection enhancing elements 20, 21, 22 may comprise heat conductive elements 20, 21 (cf. FIGS. 3*a* and 3*b*) and/or heat insulating elements 22 (cf. FIG. 3*c*).

Figure 3A:
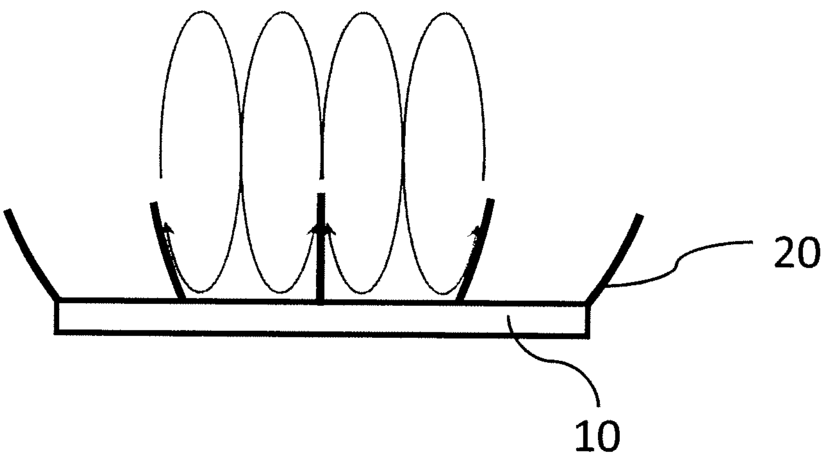
FIG. 3*a* shows a first embodiment of a convection enhancing element of an LED lamp according to the present invention.
Figure 3B:
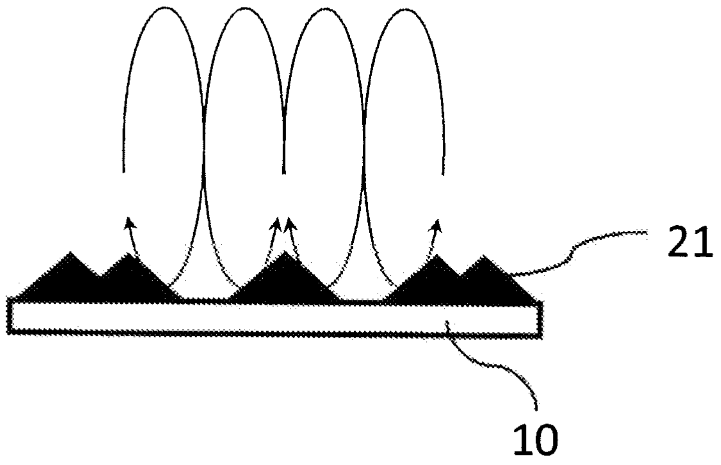
FIG. 3*b* shows a second embodiment of a convection enhancing element of an LED lamp according to the present invention.
Figure 3C:
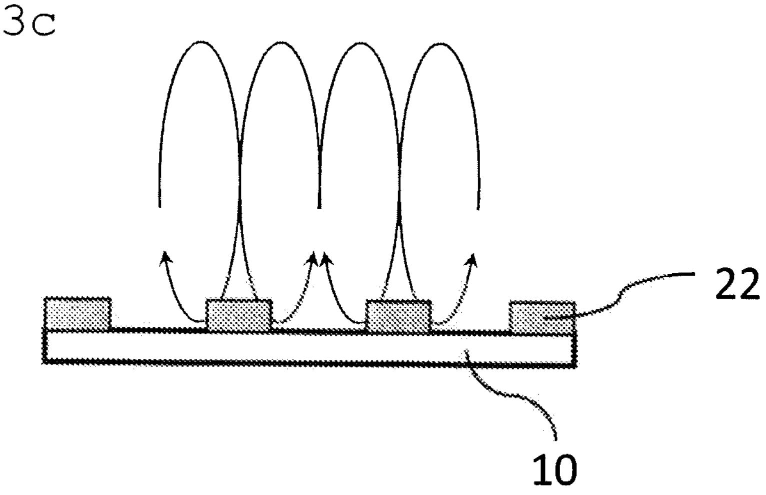
FIG. 3*c* shows a third embodiment of a convection enhancing element of an LED lamp according to the present invention.
Figure 4:
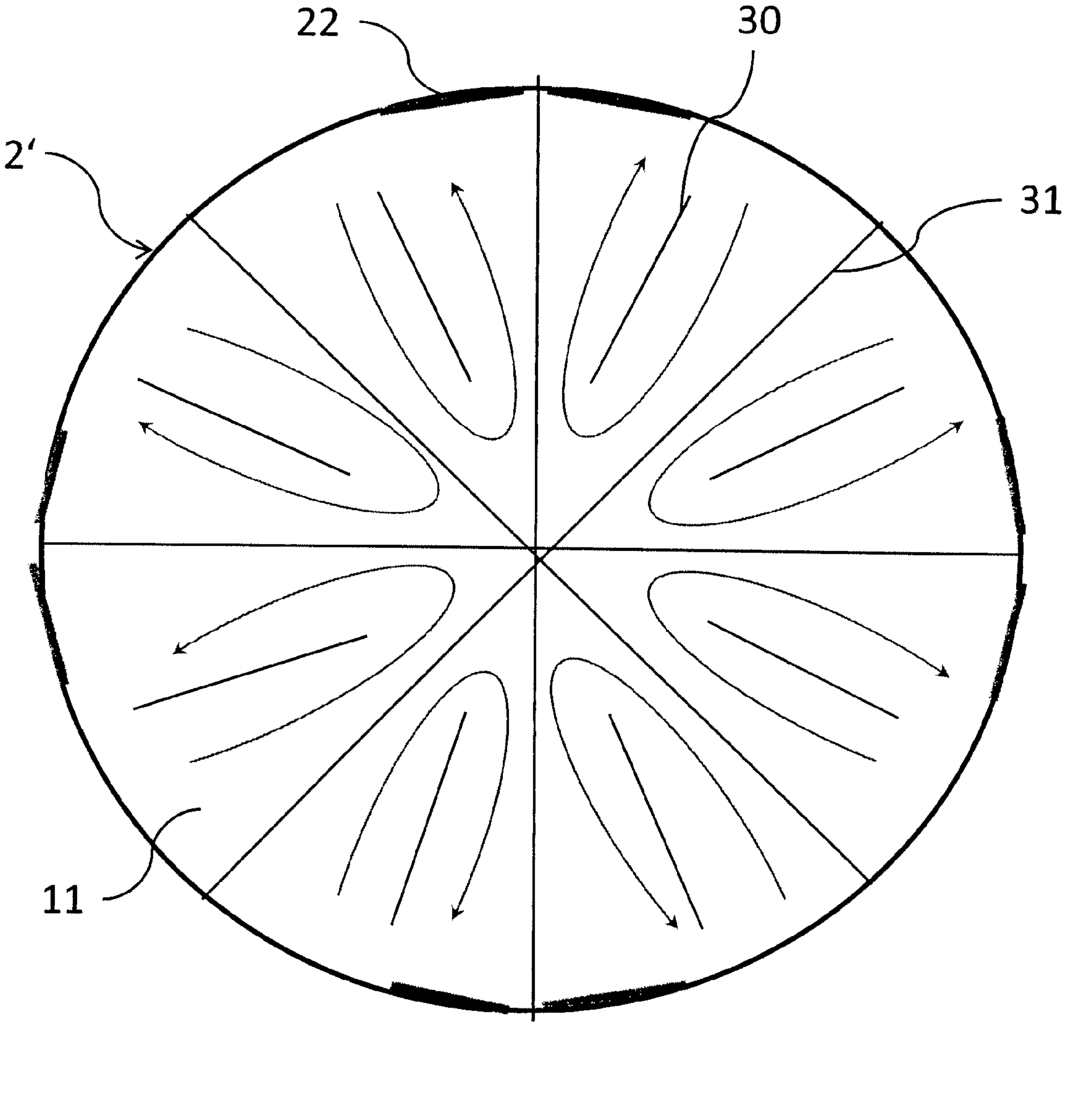
FIG. 4 shows a top view of a second embodiment of a heat dissipating means according to the present invention.

The heat conductive element 20 as depicted in the embodiment of FIG. 3*a* comprises rods extending from the base member 10 or the heat sink 9 or the LED module M (side) into the cavity 5. The rods 20 are preferably arranged at a plurality of positions around the groove region G, preferably at a constant interval along its periphery. In FIG. 3*a*, there are arranged eight rods around the periphery of the base member 10. Nevertheless, there may also be more or less rods 20 applied thereto.

The oval shaped arrows in FIGS. 3*a* (and 3*b*) schematically depict the circulation flow of the heat transfer fluid 4. Convection is enhanced since the fluid 4 is heated along the rods 20 as well. Hence, in these areas, the heated fluid 4 has a smaller density and can thus ascend inside the cavity 5. Thus, the fluid 4 is forced to ascend at predetermined areas, i.e. the areas close to the rods 20. When ascending, the fluid 4, driven by convection, is dissipating the heat to the surface of the double-layered element 3 thus cooling down. Hence, the volume is lowered again and the fluid 4 descends. As the fluid 4 is forced to ascend close to the heated rods 20 the fluid 4 is thus also forced to descend right between each of the rods 20, respectively, as a result of the convection. Hence, an enhanced circulation can be simply attained and the workflow of the convection is encouraged.

The heat conductive element 21 as depicted in the embodiment of FIG. 3*b* comprises leaders extending from the base member 10 or the heat sink 9 or the LED module M (side), i.e. from the interface region I, into the cavity 5. The leaders 21 preferably have a triangular shape with its tip projecting away from the interface region I. The leaders 21 are preferably arranged at a plurality of positions around the groove region G, preferably at a constant interval along its periphery. In FIG. 3*b*, there are arranged six leaders around the periphery of the base member 10. Nevertheless, there may also be more or less leaders 21 applied thereto. Hence, the fluid 4 is also forced to ascend along the beveled portion of the leaders 21 such that a circulation can be achieved in the same manner as also described with respect to the rods 20 in FIG. 3*a*.

A further embodiment of a convection enhancing element 22 is shown in FIG. 3*c* in which the convection enhancing elements 22 comprises a heat insulated element which is preferably arranged at the interface region I, particularly on or close to the base element 10 or the respective heat transporting element, such as the heat sink 9. The heat insulated elements 22 are preferably arranged at a plurality of positions around the groove region G, preferably at a constant interval along its periphery.

The oval shaped arrows in FIG. 3*c* also schematically depict the circulation flow of the heat transfer fluid 4. Convection is enhanced since the heat is not or less transferred close to the heat insulated elements 22 such that in this area the fluid 4 is less heated and thus tends to descend. Hence, the fluid 4 is forced to ascend at the positions between the heat insulated elements 22 since at this positions the heat is unresistedly transferred from the base element 10 and/or the heat sink 9 or the like, the density of the fluid 4 raises and thus, the fluid 4 ascends. By means of the heat insulated elements 22, the circulation of the fluid 4 can be easily enhanced as already described above.

Obviously, the invention is not limited to the shape of the convection enhancing elements as long as heating and/or insulating at predetermined positions inside the cavity 5, which is close to the interface region I, can be attained. It has to be noted that the convection enhancing elements 20, 21, 22 are preferably arranged on or close to the base element 10 or respective heat transporting elements, such as the heat sink 9 or the LED module M and protruding into the cavity 5.

Additionally, heat conductive elements 20, 21 and heat insulated elements 22 may be combined for further enhancing the circulation and thus, the convection. Then, the heat conductive elements 20, 21 and heat insulated elements 22 are preferably arranged alternately along the periphery of the groove region G, particularly the base element 10 or the heat sink 9 or the LED module M.

The heat conductive elements 20, 21 are preferably made of a heat conductive material such as, for instance, a heat conductive metal, graphite, carbon fiber, ceramic or their compound or other highly thermally conductive material. Thus, the heat can be transported to the fluid 4 over a bigger surface while the fluid 4 itself is guided along the rods 20 and/or leaders 21 so as to improve the convection. Preferably, the heat conductive elements 20, 21 are integrally formed with the heat sink 9 and/or the base element 10. Additionally, the base element 10 and the heat sink 9 can also be integrally formed. The heat insulated elements 22 are preferably made of a heat insulating material such as, for instance, silicon foam.

The flow directing elements 30, 31 are preferably arranged between the layers of the double-layered element 3, i.e. inside the cavity 5. The flow directing elements 30, 31 are preferably made of glue or polymer stripes or the like. In a preferred embodiment, the flow directing elements 30, 31 are integrally molded with the double-layered element 3.

As can be seen in FIG. 4, which is a top view of a further embodiment of the heat dissipating means 2', the flow directing elements 30, 31 are preferably arranged such that they are directed orthogonal with respect to a virtual intersection point of an elongation of the flow directing element 30, 31 and the base member 10 when seeing from said top view.

The flow directing element 30 can be designed such that it ranges from close to the groove region G, e.g. the base member 10, to a portion close to the top portion of the double-layered element 3. That is to say, that the element 30 has a base nearby but preferably not directly connected to the base member 10 or the like, and a tail extending in the fluid 4 to be far away from the LED module M. In general, the flow directing element 30 can be designed such that the fluid 4 can circulate around said element 30 thus directing the flow of the fluid 4 and enhancing the convection. It has to be noted that the shape of the flow directing element 30 is not limited to the above-mentioned shape but can be designed anyhow as long as a circulation around said element is attained for achieving an improved circulation flow of the heat transfer fluid 4.

A further flow directing element 31 can be designed such that it divides the cavity 5 into a plurality of chambers 11 which are at least partially separated from each other and which each are further in a thermally conductive connection with the base element 10 or the heat sink 9 or the LED module M, i.e. the interface region I. Thus, the flow can be even more directed and thus, enhancing the flow direction and the convection.

It is also possible to combine the flow directing elements 30, 31 for further enhancing the flow direction and thus, the convection. Additionally, the shape of the flow directing elements is not limited to the form of the embodiment as shown in FIG. 4 as long as an improvement of the circulation flow of the heat transfer fluid 4 is reached. Thereby, the convection can be enhanced since the fluid can be guided so as to achieve the best heat dissipation. Additionally, the action driven circulation is promoted without blocking the emission of the light.

The flow directing elements 30, 31 may be manufacture by the shaping of the polycarbonate mold of the double-layered element 3. Hence, flow directing elements 30, 31 can be easily provided, that is molded together with the heat dissipating means 2, thus facilitating the production and saving time and costs.

As can be seen in FIG. 4 as well, the flow directing elements 30, 31 and the convection enhancing elements 20, 21, 22 can be combined somehow for further enhancing the convection. In FIG. 4, the flow directing elements 30, 31 are combined with heat insulated elements 22. Nevertheless, any other possible combination of the elements or other beforementioned elements in any possible alignment and arrangement are covered by the invention.

With respect to FIGS. 5 to 7 a further embodiment of the invention is described in which phase changes of the heat transfer fluid 4 is used, e.g., the fluid 4 which is evaporated using the heat radiated from the LED module M and which then condensates at colder regions of the heat dissipating means 2' again when cooling down due to circulation caused by the convection, and with which an even smaller amount of a heat transfer fluid 4 is needed. Hence, since only a little amount of said fluid 4 is needed and the cavity 5 is thus not completely filled with said fluid 4, the weight of the LED lamp 1' can be even more reduced while the risks of spilling hot liquid when being broken is minimized.

FIG. 5 shows a schematic side view of an LED lamp 1' according to said further embodiment. The LED lamp 1' comprises an LED module M mounted on a heat sink 9. At its outer periphery a heat dissipating means 2' is attached such that it spans over the LED module M. The two layers of the double-layered element 3' are molten at its bottom end thus sealing the heat transfer fluid 4. It has to be noted that, with respect to the description above, the heat dissipating means 2' may also be attached to the LED module M. Moreover, the two layers 7, 8 may also not be molten but bonded to a base member preferably arranged between the heat sink 9 or LED module M and the heat dissipating means 2' as described above.

Said embodiment shows an embodiment of the LED lamp 1' in which the cavity 5 must not be completely filled with heat transfer fluid 4 but merely a little amount of said fluid is needed for heat dissipation. In this embodiment, the heat transfer fluid 4 is heated via any of the LED module M, the heat sink 9 and/or the base element 10 at an interface region I. Due to the heat, the heat transfer fluid 4 is evaporated and thus raises inside the cavity 5. At colder regions of the heat dissipating means 2', that is regions being distanced from the LED module M, heat sink 9 and/or base element 10 (i.e. the interface region I), the vaporized fluid 4 will be condensed again. The condensed fluid 4 will then drive back to the interface region to be heated and evaporated again for heat dissipation reasons.

To achieve a drive back of the heat transfer fluid 4 into the groove region G and thus as close as possible to the interface region I, that is as close as possible to a region of the cavity 5 being in contact with the base element 10 or the heat sink 9 or the LED module M, at whatever part the heat dissipating means 2' is attached to, the two layers 7, 8 of the double-layered element 3' converge at least in the groove region G of the heat dissipating means 2' such that capillary forces can be effective in said groove region G. This is exemplarily shown in FIG. 7, in which the two layers 7, 8 converge in the groove region G. Hence, when the heat transfer fluid 4 flows back after being condensed again, due to the capillary forces effected by the two layers 7, 8 being comparatively close to each other in the groove region G, the heat transfer fluid 4 thus being sucked into the groove region G so that it is securely driven back as close as possible to the interface region I.

For further enhancing said arrangement, the heat dissipating means 2' may further comprise a wick means 40 for even better accumulating the heat transport fluid 4 at a position close to the interface region I, that is in the groove region G. Therefore, the wick means 40 preferably extends into the cavity 5 from the groove region G of the heat dissipating means 2' close to the heat sink 9, the base element 10 and/or the LED module M, i.e. the interface region I, away from the LED module M. This is shown in the embodiment as depicted in FIG. 5.

The wick means 40 can be made of glass fiber, porous coating or finishing of the inner surface or any kind of surface patterning. In a most preferable embodiment, said wick means 40 is transparent or translucent such that the light emitted by the LED module M can pass the wick means 40 unaffected, thus not hindering the light emission or distribution.

FIG. 6 schematically shows a wick means 40 as, for instance, a groove fine structure on the internal surface of the heat dissipating means 2'. Due to said grooves 41, capillary action is promoted thus the heat dissipating fluid 4 can drive back into the groove region G in a simple and certain way.

In a most preferred embodiment, the wick means 40 and the converged groove region G are both applied to the LED lamp 1. Hence, the drive back of the heat transfer fluid 4 into the groove region G can be assured best. Nevertheless, the invention is not limited to the above-described wick means 40 but to all kind of means with which capillary forces are effective to promote the flow back of the heat transfer fluid 4 into the groove region G, preferably without hindering the light emission or distribution.

The heat transfer fluid 4 in said embodiment can be a fluid which evaporates due to the heating emanating from the LED module such as, for instance, water, or acetone, or alcohol, or a composition thereof.

Figure 8:
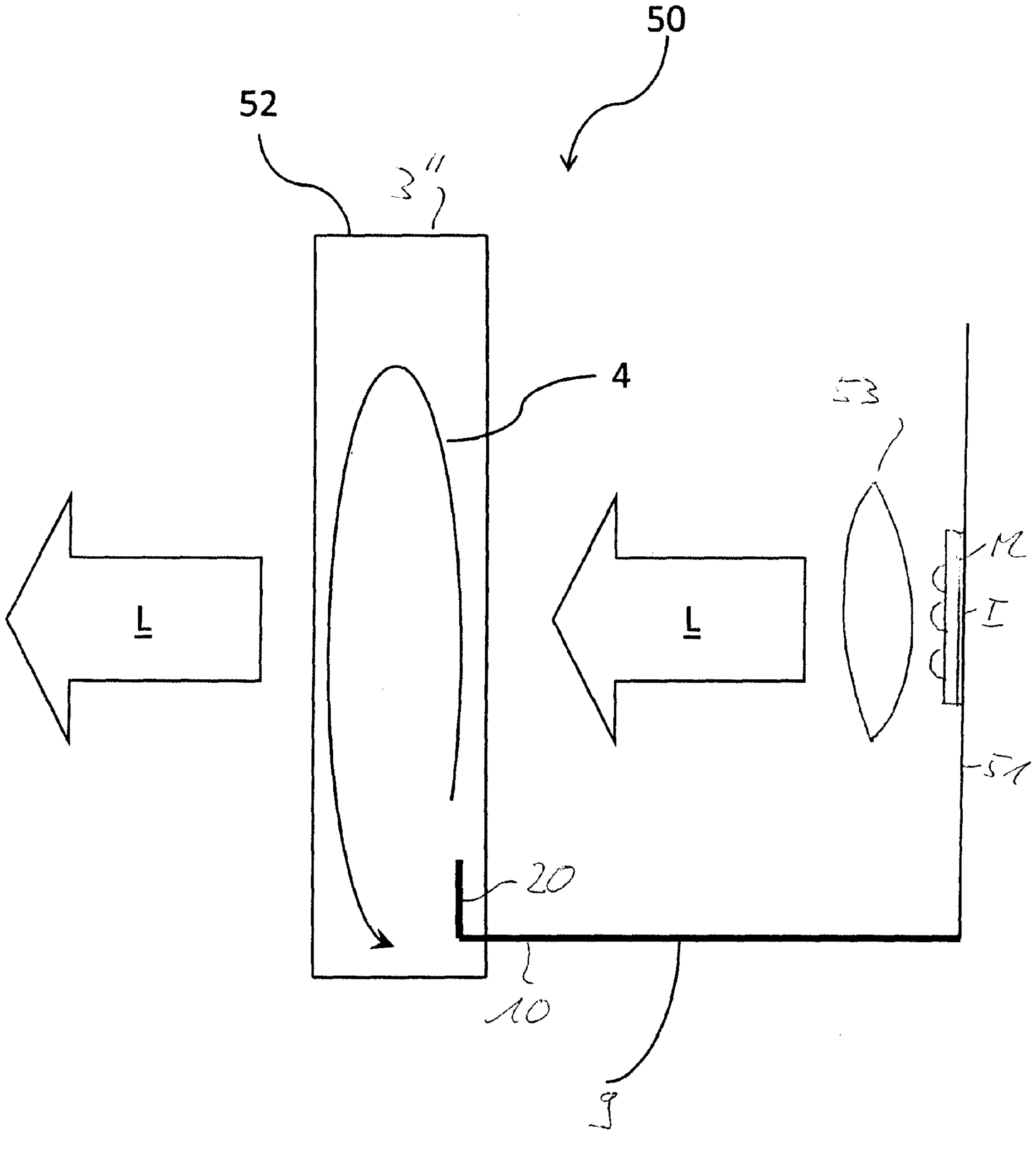
FIG. 8 shows a schematic side view of a headlamp according to the present invention.

FIG. 8 shows a schematic side view of a vehicle's headlamp (head light) 50 comprising an LED lamp according to the present invention and to be mounted to the front of a vehicle. The vehicle may be an automobile.

The headlamp may comprise a plurality of LED modules M.

An optical element 53, such as e.g. one or more lenses may be provided in contact with the LED module or separated from the LED module by at least one material with differing refraction index, such as e.g., air.

In the shown example the LED module M may be in contact with a heat sink 51 or a heat pipe. The heat sink 51 or heat pipe is in thermal contact with the headlamp housing 52. Said housing may comprise a reflector for dispersing the light L emitted by the LED module and a transparent or translucent cover or lens member through which the light L may exit the housing 52. The headlamp housing 52 comprises an at least partially double-layered element 3" having a heat transfer fluid 4 filled cavity in-between for fluid 4 circulation, thus forming a heat dissipating means according to the invention. According to said structure, active cooling systems are not necessary due to good heat dissipation while at the same time defrosting of the headlamp is managed when being frosted as, for instance, during cold seasons.

Although the present invention has been described with reference to preferred embodiments thereof, many modifications and alternations may be made by a person having ordinary skill in the art without departing from the scope of this invention which is defined by the appended claims. For example, the heat dissipating means are not limited to the two embodiments of the invention but may also designed in any different way as long as being covered by the claims. Additionally, the aforementioned embodiments may also be combined in any way such that the LED lamp 1, 1' may comprise any of the features heat sink 9, base element 10, convection enhancing elements 20, 21, 22, flow directing elements 30, 31, wick means 40, and/or the converged groove region G. Moreover, the heat dissipating means 2, 2', particularly the two layers 7, 8 of the double-layered element 3, 3' can be either bonded to the base element 10 or any other sealing member or may also be molten at their open end thus sealing the heat transfer fluid 4.

The embodiments of the invention in which an exclusive property or privilege is claimed are defined a follows:

1. A LED lamp, comprising a heat dissipating device configured for dissipating heat from a heat sink, wherein the heat dissipating device comprises an at least partially double-layered element having a heat transfer liquid filled cavity for liquid circulation, and wherein the heat dissipating device includes a light diffuser configured for light distribution of the light emitted by a LED module, wherein the layers of the double-layered element converge at least in a groove region of the heat dissipating device close to an interface region with one of the LED module, the heat sink or the base element such that capillary forces can be effective in said groove region.

2. The LED lamp of claim 1, wherein the heat dissipating device is designed such that the circulation is achieved by heat convection.

3. The LED lamp of claim 1, wherein the double-layered element is a transparent cap.

4. The LED lamp of claim 1, wherein the heat dissipating device is a liquid filled double-walled transparent envelope having an inner shell and an outer shell.

5. The LED lamp of claim 4, wherein the transparent envelope and the liquid have substantial matching refractive indexes, at least within 6% of one another.

6. The LED lamp of claim 1, wherein the LED lamp is a retrofit LED lamp or a retrofit LED light bulb.

7. The LED lamp of claim 1, further comprising LED module, which is attached onto a heat sink, wherein the heat dissipating device is designed such that the liquid can circulate inside of the double-layered element for dissipating heat from the heat sink.

8. The LED lamp of claim 7, wherein the base element is arranged between the heat sink and the heat dissipating device for heat conductive sealing.

9. The LED lamp of claim 1, wherein the heat transfer liquid is sealed by the two layers of the double-layered element being molten at their open end or by a base element.

10. The LED lamp according to claim 9, wherein the base element is a ring member.

11. The LED lamp of claim 10, wherein the two layers of the double-layered element are bonded to the inner and outer side of the ring member by glue or heating.

12. The LED lamp of claim 1, wherein flow directing elements are arranged between the layers of the double-layered element.

13. The LED lamp of claim 12, wherein the flow directing elements are integrally molded with the double-layered element.

14. The LED lamp of claim 12, wherein the flow directing elements are made of glue or polymer stripes.

15. The LED lamp of claim 14, wherein convection enhancing elements are arranged between the layers of the double-layered element.

16. The LED lamp of claim 15, wherein the convection enhancing elements comprise heat conductive elements or heat insulated elements.

17. The LED lamp of claim 16, wherein the heat conductive elements comprise rods and/or leaders extending from an interface region of the heat dissipating device and one of the LED module, the heat sink or the base element into the heat transfer liquid filled cavity.

18. The LED lamp of claim 16, wherein the heat conductive elements are made of heat conductive material(s), including a heat conductive metal(s).

19. The LED lamp according to claim 16, wherein the heat insulated element is formed by electrically insulating material(s).

20. The LED lamp of claim 15, wherein the convection enhancing elements comprise heat conductive elements and heat insulated elements being alternately arranged.

21. The LED lamp of claim 1, wherein the heat transfer liquid comprises a water-based antifreeze agent containing alcohol or glycol, mineral oil, silicon oil or any combination thereof.

22. The LED lamp of claim 1, wherein the heat dissipating device comprises a wick means for accumulating the heat transporting liquid in a groove portion of the heat dissipating device close to an interface region with one of the LED module, the heat sink or the base element.

23. The LED lamp of claim 22, wherein the wick means extends into the cavity from the groove region away from the LED module.

24. The LED lamp of claim 22, wherein the wick means is made of glass fiber, porous coating or finishing of the inner surface or any kind of surface patterning.

25. The LED lamp of claim 22, wherein the wick means is transparent or translucent.

26. The LED lamp of claim 22, wherein the heat transfer liquid is water, or acetone, or alcohol, or a combination thereof.

27. The LED lamp of claim 2, wherein the layers of the double-layered element are arranged substantially parallel to each other.

28. The LED lamp of claim 1, wherein the double-layered element is made of glass or plastic material(s), substantially transparent or translucent material.

29. A headlamp comprising a LED lamp according to claim 1.

30. The headlamp of claim 29, further comprising a headlamp housing, wherein the headlamp housing at least partially comprises the heat dissipating device.

31. A method for dissipating heat from a LED lamp the method comprising:

transferring the heat of the LED module to the heat sink and then to an interface region of a heat dissipating device having an at least partially double-layered element filled with a heat transfer liquid, and dissipating the heat via the heat transfer liquid by heat convection inside of the heat dissipating device, wherein the heat dissipating device includes a light diffuser configured for light distribution of the light emitted by the LED module, and wherein the layers of the partially double-layered element converge at least in a groove region of the heat dissipating device close to an interface region with one of the LED module, the heat sink or the base element such that capillary forces can be effective in said groove region.

32. The method of claim 31, further comprising:

evaporating the heat transfer liquid when being heated, condensation of the vapor at colder regions of the heat dissipating device, and driving back of the condensate to the groove region of the heat dissipating device close to the interface region with one of the LED module, the heat sink or the base element by capillary forces.

33. The method of claim 32, wherein the capillary forces are generated by a wick means and/or the two layers of the double-layered element converging in the groove region.

* * * * *